(12) United States Patent
Chirnomas

(10) Patent No.: US 6,968,974 B2
(45) Date of Patent: Nov. 29, 2005

(54) LINKAGE APPARATUS USEFUL IN AN ARTICLE HANDLING DEVICE

(76) Inventor: Munroe Chirnomas, 47 Skyline Dr., Morris Township, NJ (US) 07960

( * ) Notice: Subject to any disclaimer, the term of this patent is extended or adjusted under 35 U.S.C. 154(b) by 0 days.

(21) Appl. No.: 10/228,914

(22) Filed: Aug. 27, 2002

(65) Prior Publication Data

US 2003/0047569 A1 Mar. 13, 2003

Related U.S. Application Data

(63) Continuation-in-part of application No. PCT/US01/16916, filed on May 23, 2001.
(60) Provisional application No. 60/315,082, filed on Aug. 27, 2001.

(51) Int. Cl.$^7$ ................................................ G07F 11/00
(52) U.S. Cl. ...................................... 221/9; 414/797
(58) Field of Search ........................ 221/2, 7, 13, 278, 221/268, 191, 9, 211, 129, 92; 414/796.9, 797; 700/251

(56) References Cited

U.S. PATENT DOCUMENTS 5,240,139 A * 8/1993 Chirnomas .................... 221/2
6,006,946 A * 12/1999 Williams et al. ................ 221/9

* cited by examiner

Primary Examiner—Kenneth W. Noland
(74) Attorney, Agent, or Firm—Lawrence C. Edelman

(57) ABSTRACT

An article dispensing apparatus embodied, for example, as a vending machine, including a controllably positioned suction hose dispenser for retrieving articles from a storage area. In one embodiment, an airflow control mechanism, i.e., a vacuum or suction release (i.e., breaker), is used to facilitate a "quick-release" of the article being handled. A mechanical linkage constructed and operating in accordance with the invention is used to activate, for example, the breaker in response to mechanical contact by the article handling mechanism. Such operation thereby causes a rapid equalization of air pressure inside the housing towards ambient when it is time for the article handling mechanism to release the selected article. In accordance with one aspect of the invention, the linkage comprises an elongated rotating member having a first portion adapted for being operated (directly or indirectly) by the article handling mechanism at the point in its article handling motion when it is time to release the article being handled, and a second portion adapted to operate, for example, a quick-release suction breaker.

19 Claims, 8 Drawing Sheets

LINKAGE APPARATUS USEFUL IN AN ARTICLE HANDLING DEVICE

CROSS-REFERENCE TO RELATED APPLICATIONS

This application is a CIP of and claims priority under 35 USC 120 of PCT Patent Application No. PCT/US01/16916, filed May 23, 2001, entitled "Method And Apparatus For Article Contact Detection In An Article Handling Device", and claims priority under 35 USC 120 of U.S. Provisional Patent Application No. 60/315,082, filed Aug. 27, 2001, entitled "Linkage Apparatus Useful In An Article Handling Device". The entire disclosure of these patent applications are incorporated herein by reference in their entirety.

BACKGROUND OF THE INVENTION

1. Field of the Invention

The present invention relates generally to improvements in the design and operation of article handling apparatus and is particularly useful in the environment of article handling devices that use a suction-type article handling mechanism including a quick release device.

2. Description of the Prior Art

Most prior art article handling mechanisms, more specifically referred to in the description of the present invention as being in the environment of a point-of-sale (POS) article dispenser, rely on a multitude of motors, switches and solenoids for moving various portions of the handling mechanism, and handling of the articles themselves, such as packaged products. Most machines of this type require one motor, switch and/or solenoid dedicated for each row, column or type of article or package to be handled or dispensed therefrom. Such machines generally suffer from numerous disadvantages, such as poor reliability due to mechanical failures, as well known by those skilled in this art.

U.S. Pat. No. 5,240,139 represents a significant improvement in article handling devices. It describes the use of a negative air pressure lifter (i.e., article pickup or handling mechanism), which uses suction, i.e., a reduced or so-called "negative" air pressure created by a partial vacuum, for making a secure contact to an article to be retrieved by entering the open top of an article storage bin located in a refrigerated storage area of a vending machine. Although robotic, and specifically suction-type lifting mechanisms are in common use in factory settings, where space limitations are generally relaxed, their use in tight confines, such as an article vending machine, has not gained wide acceptance. Due to the greater reliability and versatility of vending machines of the type which utilizes suction technology for grasping and moving selected articles, it would be desirable to develop new techniques and methods for the operation and control of such machines, as well as for other more generalized article handling mechanisms.

Article contact detection is provided in the forenoted U.S. Pat. No. 5,240,139 by a mechanical or electromechanical proximity switch mounted at the article pickup end of the negative air pressure lifter.

It is desirable to avoid the use of a proximity switch type of sensor at the article pickup end of the lifter, most notably because of the necessity of providing to the pickup head electrical power and signal carrying conductors necessary for operating the switch. Such conductors not only may present obstacles to the freedom of movement of the pickup head, but may also present reliability problems due to their potential for breakage.

Applicant's patent application PCT/US01/16916 entitled METHOD AND APPARATUS FOR ARTICLE CONTACT DETECTION IN AN ARTICLE HANDLING DEVICE, filed May 23, 2001, describes an article dispensing apparatus embodied, for example, as a vending machine, which includes a controllably positioned suction hose dispenser for retrieving articles from a storage area. In one embodiment, a sensor having an output responsive to changes in partial pressure inside the air hose, such as an airflow sensor coupled to the suction-hose, initially acts to sense the timing of contact of the suction hose with an article to be dispensed. As long as suction is provided to the gripping end of the suction hose prior to the hose contacting the article to be retrieved, the airflow (and partial pressure) inside the hose will change dramatically when the gripping end of the suction hose makes contact with the article. At the moment when the gripping end of the suction hose is no longer in substantial contact with the article, the airflow sensor again provides an indication signal, due to the sudden change in airflow (and partial pressure) that occurs at that time within the hose. The signals generated by the airflow sensor are used in place of those generated by the prior art mechanically operated proximity sensor, and may be used to stop the approach of the gripping end of the hose towards the article, and serve as an indication to initiate removal of the article from the storage area. Alternatively, the airflow sensor can be used in conjunction with the proximity sensor, as a further check of the proper operation of the suction generating portion of the dispenser apparatus, since the airflow sensor actually monitors air flow.

In the above embodiment, the airflow sensor is used to operate an airflow control mechanism, i.e., a vacuum or suction release (i.e., vacuum breaker), to facilitate a "quick-release" of the article being handled. The airflow sensor can be included in its own housing, or as in the illustrated embodiment, a housing which also includes therein the vacuum release/breaker mechanism. In one embodiment, the vacuum release mechanism comprises a movable flap which in its normal position seals an opening in a sidewall of the airflow housing. A mechanical "see-saw"-type linkage mounted in the top of the front door of the vending machine cabinet is used to activate the vacuum release mechanism in response to mechanical contact by the article handling mechanism when it reaches the dispensing area. Contact at one end of the linkage causes linkage at the other end to move the flap and unseal the opening in the airflow housing.

The present invention is directed to improvements in the design and operation of a mechanical linkage which can be used, in one embodiment, to activate a vacuuum release/breaker mechanism in response to movemement of the article handling mechanism.

OBJECTS OF THE INVENTION

Accordingly, one of the objects of the present invention is to provide new techniques and methods for the design, operation and control of article handling mechanisms.

It is a further object of the present invention to provide new techniques and methods for the design, operation and control of article handling mechanisms of the type that utilize computer-controlled electromechanical technology, and in the illustrated embodiment a robotically positioned gripper, of for example the suction-type, for grasping and moving a selected article from one area to another, such as from a storage area to a dispensing area.

It is also an object of the present invention to provide new techniques and methods for such mechanisms, which improve the speed and accuracy of the article handling operation while still handling the articles to be dispensed in a careful manner so as to prevent any damage thereto.

It is still a further object of the present invention is to provide a linkage apparatus responsive to the article handling mechanism for activating a quick-release apparatus, such as a suction release mechanism, where the linkage apparatus:

minimizes alignment, fit and tolerance problems that may arise between the article handling mechanism and the suction release mechanism, is simpler to make and assemble, and lower cost to manufacture than structures that provided a similar basic function in the prior art, is compact and low-profile in its design and operation, i.e., statically and dynamically, is flexible in that it can be easily activated at multiple locations.

SUMMARY OF THE INVENTION

The above objects are achieved in an illustrated embodiment of an article dispensing apparatus embodied, for example, as a vending machine which includes a controllably positioned suction hose dispenser for retrieving articles from a storage area. In an embodiment illustrated herein, an airflow control mechanism, i.e., a vacuum or suction release (i.e., breaker), is used to facilitate a "quick-release" of the article being handled. A mechanical linkage constructed and operating in accordance with the invention is used to activate, for example, the breaker in response to mechanical contact by the article handling mechanism. Such operation thereby causes a rapid equalization of air pressure inside the housing towards ambient when it is time for the article handling mechanism to release the selected article. In accordance with one aspect of the invention, the linkage comprises an elongated rotating member having a first portion adapted for being operated by the article handling mechanism at the point in its article handling motion when it is time to release the article being handled, and a second portion adapted to operate, for example, a quick-release suction breaker.

In one preferred embodiment, the linkage may comprise a shaft having bent or "crank" portions at opposite ends thereof which serve as the first and second portions. The length of the crank portions are a matter of design choice and present no burden to the linkage design or its operation. Accordingly, such design is extremely efficient with respect to the amount of space needed for its mounting (i.e., its "static" requirements) as well as with respect to the amount of space needed for its operation (i.e., its "dynamic" requirements).

In another embodiment, one or both of the crank portions of the linkage may comprise a tab, and in fact in a further embodiment the entire shaft may comprise an elongated member having any desired multi-axis cross-section, such as an "L" shape, thereby obviating the need to use discrete tabs as the crank portions. In the preferred embodiment the crank or tab portions are directly operated by (or directly operate) the article handling mechanism (or vacuum breaker), however intermediate linkages may be used for causing an indirect initiation of the crank and/or activation of the quick-release suction breaker.

Furthermore, such a design lends itself to an efficient mounting within the cabinet which houses the article handling mechanism, as compared with the linkage disclosed in Applicant's above-noted patent application PCT/US01/16916. For example, Applicant's prior linkage was mounted in the front door of the vending machine, and therefore had further restrictions placed on it's movement as well as it's tolerances and fit with other portions of the vending machine to which it was mounted and through which it operated/interfaced with other components.

Even furthermore, such a design lends itself to easy adaptation so as to include surfaces which may be more easily contacted, and which may more easily and directly operate the quick release.

DETAILED DESCRIPTION OF PREFERRED EMBODIMENTS OF THE INVENTION

Figure 1:
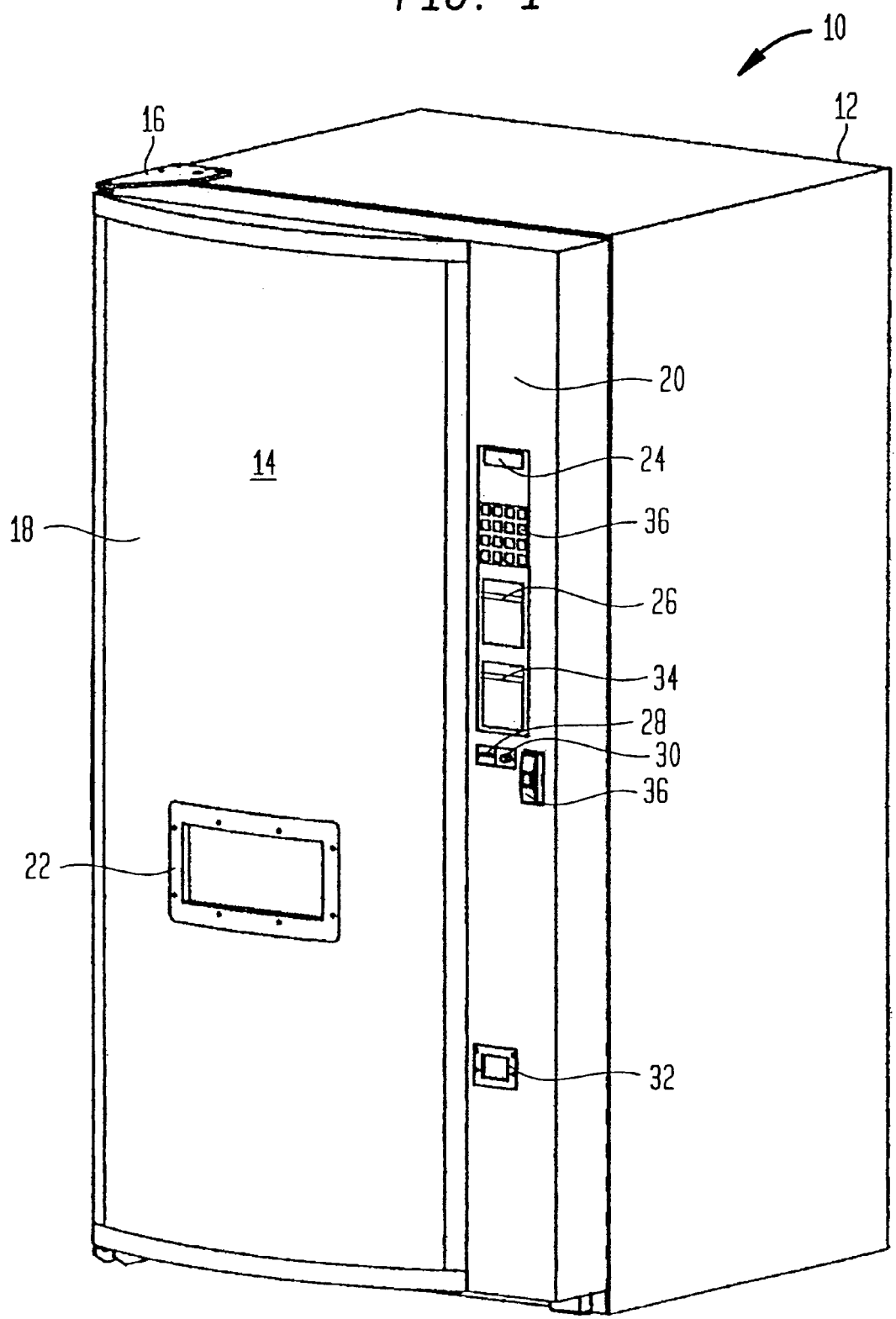
FIG. 1 is a front perspective view of a vending machine constructed and operating in accordance with the principles of the invention.

FIG. 1 illustrates an environment for use of linkage assembly of the invention described herein, in the form of an article dispenser, such as a point-of-sale (POS) dispenser. Although throughout the following description, reference is made to implementation of the inventive linkage in a vending machine environment, it is intended that the term "vending machine", and in fact the environment for the present invention, include more general purpose article handling, retrieval and/or dispensing apparatus, as well as POS equipment. Such equipment, if embodied as a portable device may comprise and be about the size of a traditional vending machine or as large as a tractor-pulled trailer, and if embodied as a non-portable device may comprise and be embodied as an automated dispensing room or an area located in a permanent structure, such as in a building (aboveground or underground, and with or without interior walls or an enclosing cabinet). Furthermore, it is intended that the term "articles" or "products" include in at least some of the embodiments of the invention described herein, not only goods, but also services and/or information, in either a permanent or temporal form.

Accordingly, FIG. 1 illustrates a perspective view of a vending machine 10, comprising one embodiment for an apparatus which is constructed and operates according to the present invention. Vending machine 10 includes a main cabinet 12 and a front door 14 mounted on a hinge 16 for providing access to the interior of the vending machine for servicing (refilling it with articles, maintenance, etc.). Note, in a further vending machine embodiment, a service door or port could be positioned anywhere on or as a part of cabinet 12. In FIG. 1, front door 14 is shown in a closed position, forming an enclosure with main cabinet 12, within which various components of vending machine 10 are housed, as explained in more detail below.

Front door 14 includes a convex-shaped section 18 adjacent a flat section 20; however, these particular shapes are not necessary to the invention. The convex-shaped section 18 comprises a translucent plastic display panel 18, which typically has brand name and/or logo graphics displayed thereon, and may even include graphics which illustrate the individual articles that are vendible by vending machine 10, as well as the price and/or selection information for the articles. Panel 18 is typically back-light using fluorescent bulbs, not shown.

A customer retrieval area 22 is formed in the panel 18 on door 14 so that articles stored therein can be discharged to a user of vending machine 10. Although one customer retrieval area 22 is shown, it will be apparent from further description that the article handling apparatus of the present invention, in a further embodiment, could just as easily dispense articles to multiple customer retrieval areas.

Various user interface components are mounted on flat section 20 of door 14. A customer display 24 may be a conventional fluorescent or LED display panel for displaying various items of information to a user of machine 10, such as feedback to the user of the selection made, the amount tended, and if the product is sold out or being vended. For accepting payments, a bill acceptor slot 26 accepts paper money into a conventional bill acceptor mechanism (mounted inside machine 10 so as to have its user interface portion extend through an aligned opening in flat section 20) for purchasing articles or for making change. A coin insertion slot 28 accepts coins into a conventional coin changer (also mounted inside machine 10 so as to have its user interface portion extend through an aligned opening in flat section 20) for purchasing articles or for making change. A coin return actuator 30 comprises a conventional push-button mechanism for activating a coin return portion of the coin changer mechanism which, upon actuation returns coins inserted by the current user, to a coin return well 32. The coin return portion of the coin changer mechanism also provides change to the coin return well 32 either in response to the purchasing of articles or for making change for paper money or larger coins. A credit/debit card slot 34 accepts a plastic credit/debit card inserted into a conventional card reader mechanism (also mounted inside machine 10 so as to have its user interface portion extend through an aligned opening in flat section 20) for allowing a user to pay for purchases via credit/debit cards. A door lock mechanism 36 enables front door 14 to be secured so that it cannot be opened without a key. For allowing user selections, display panel 18 may include graphics, as noted above, which indicates the various articles vendible by the machine, as well as their associated price and unique selection number. In a further embodiment, flat section 20 could include a group of graphic article displays and their associated price. A conventional keypad push-button mechanism 38 is provided for enabling a user to select a desired article from vending machine 10. In a further embodiment, pushbutton mechanism 40 could include individual push buttons for each article selection, as well as an associated price display; and even furthermore, a user operated touch screen could replace pushbutton mechanism 40 and display 24. Although not shown in FIG. 1, machine 10 also includes a conventional telecommunications component that can be used for authenticating credit card purchases, as well as other uses relating to machine control and reporting the inventory and operational status of machine 10 to a remote location, as more fully described later on. Although vending machine 10 is illustrated to include the above described user interface components, in a more minimal embodiment of the invention, most, if not all, of these user interface components could be omitted, and the dispenser could in fact be controlled from a remote location, with or without a local payment system.

Figure 2:
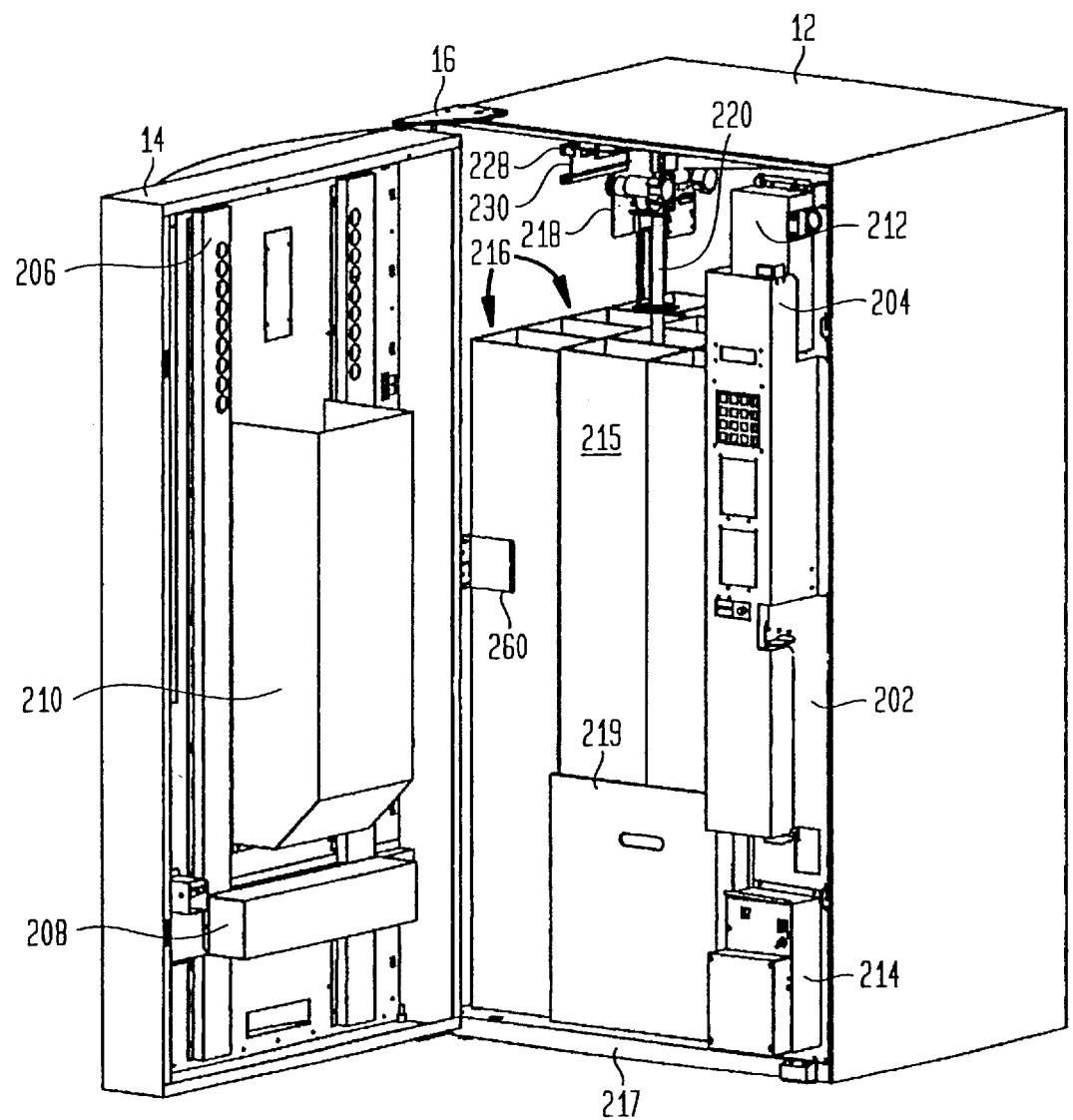
FIGS. 2 and 3 are front perspective views of the vending machine of FIG. 1, with the front door opened, so as to illustrate the main mechanical and electrical components therein.
Figure 3:
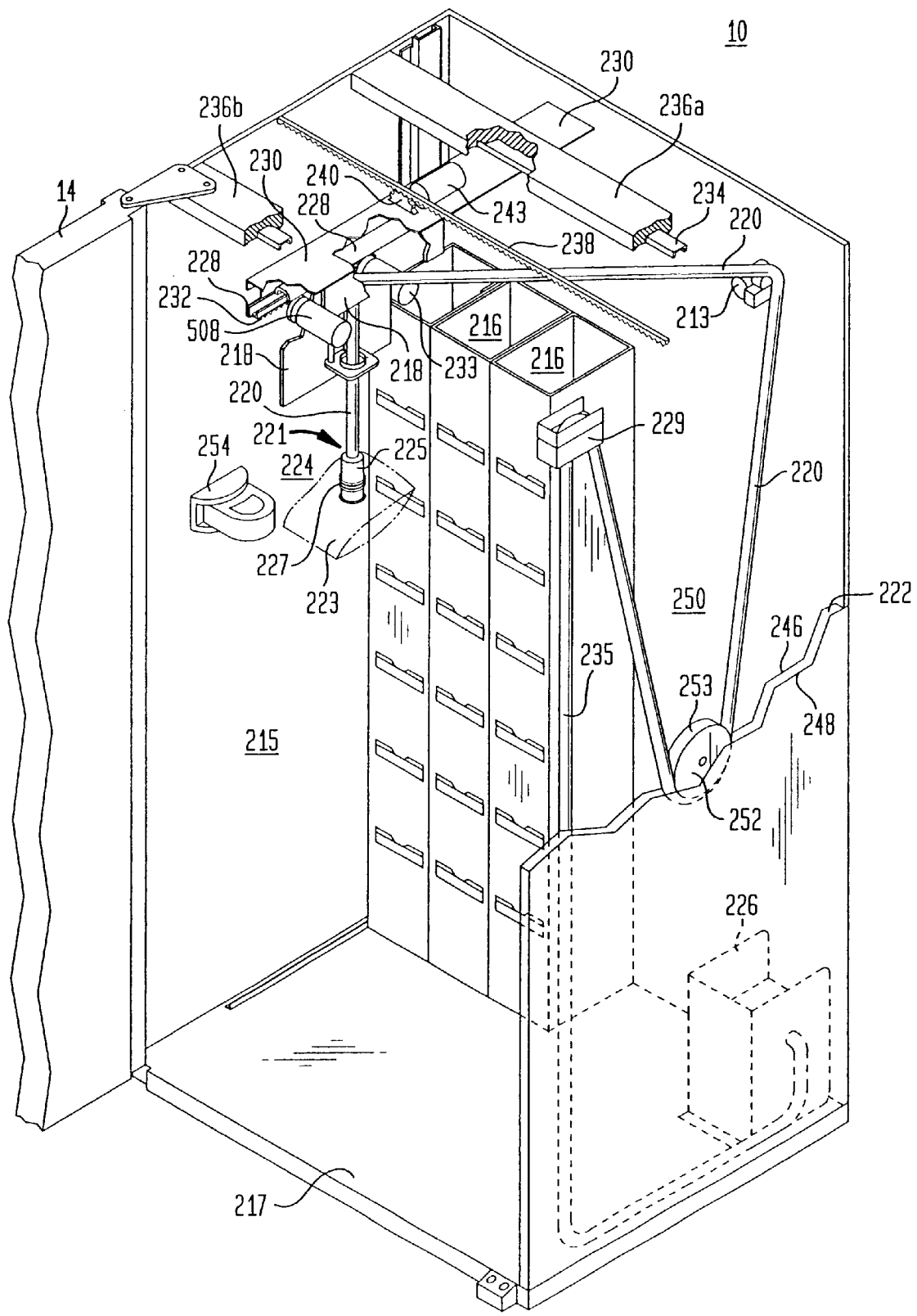

FIGS. 2 and 3 are front perspective views of the vending machine of FIG. 1, with the front door open, so as to illustrate the main mechanical and electrical components therein. Note, some portions of vending machine 10 are shown in these FIGURES cut away in order to better illustrate the interior components.

Referring first to FIG. 2, it is noted that the right portion of the front of cabinet 12 includes a vertically mounted support panel 202 which is used for mounting most of the user interface components. More specifically, a hinged mounting bracket 204 is mounted on panel 202 and aligned with an opening in door 14 so that the user interface components, such as the selection button keypad 40, coin insertion slot 30, bill acceptor slot 28, coin return 32, and customer display 24, are all accessible to the user from the front side of door 14. For backlighting panel 18, two fluorescent bulb light sources (other numbers of light sources can be used), are mounted on the interior of front door 14 behind protective covers 206. Also mounted on the interior of front door 14 is a ballast 208 for the fluorescent bulbs, and a product delivery chute 210. Note that product delivery chute 210 is unconventional in that it is extremely tall, and therefore serves as a security measure to prevent unauthorized access into the machine by insertion of an arm or other grasping mechanism into the customer retrieval area 22 from outside the machine. In typical prior art vending machines, a swinging security door is usually found at the top of chute 210, which swings into a vandal blocking position when the customer pushes in the swinging door at the entrance to the product retrieval area 8. In a further embodiment of vending machine 10, such a security door could be used in conjunction with product delivery chute 210, especially if chute 210 is not as tall as the one illustrated in FIG. 2 and also if the product retrieval area 8 is located higher up on machine 10. Mounted behind hinged mounting bracket 204 is a conventional bill acceptor mechanism for causing paper money inserted into bill acceptor slot 28 to be drawn into vending machine 10, a conventional coin changer for supplying coins to coin return slot 34, and a conventional bill validator for ascertaining proper insertion of paper money into bill acceptor slot 28.

A control board 212 comprises a printed circuit board on which circuitry is formed and to which integrated circuit chips are attached. Control board 212 includes a microprocessor that is electrically connected to various sensors, motors, the above described user interface elements, as well as other devices within vending machine 10, to control the operation of vending machine 10 as described herein. When reference is made in this description to performance of specified functions by control board 212, it is to be understood that these functions are controlled by the microprocessor and the associated circuitry formed on control board 212. A power supply 214 is mounted on panel 202 and supplies power for the electrical components of vending machine 10.

Referring now also to FIG. 3, it is apparent that the bulk of the interior of cabinet 12 is available as an article storage area 215. In the illustrated embodiment, a plurality of vertically aligned article storage bins 216 are arranged on the interior floor 217 of cabinet 12, for storing articles 223 to be vended by machine 10. In a refrigerated environment for the present invention the bins could be arranged to sit on a shelf positioned above the refrigeration system.

An opened-top container 219 can be dimensioned to hold a plurality of article storage bins 216 therein, and used, for example to facilitate the simultaneous handling (i.e., removal, installation and transportation) of the plurality of bins 216 into/out of the article storage area 215. Container 219 also facilitates rapid and accurate positioning of a plurality of the article storage bins into the storage area of the article handling apparatus. A carriage 218 (which may be more generally referred to as an X-Y or planar positioning mechanism) is coupled to the interior topside of cabinet 12 and adapted for being controllably positioned in response to control signals generated by the control board portion 212 of machine 10, to a location centered over (so as to be aligned with) the open-top end of a selected one of article storage bins 216.

Although vertical alignment of the article storage bins 216 is shown, non-vertical, i.e., slanted or even horizontal alignment is also possible. Furthermore, although article storage bins 216 are shown to be in an ambient environment, bins 216 could in fact be positioned in a freezer which is located in the bottom of storage area 217, such as shown and described in the forenoted U.S. Pat. No. 5,240,139 or the entire storage area may be located in a refrigerated or frozen environment inside cabinet 12.

In the environment of the present invention, an air hose 220 is continuous from a point before it's exit from a hose storage area 222 over orthogonally positioned rollers 213 (or other low-friction arrangement), to its free end 221. Free end 221 includes a weighted portion 225 in combination with a bellows extension tip portion 227. Depending upon the physical characteristics of the articles to be dispensed, article pickup head 224 may comprise only the weighted portion 225, or this portion in combination with a fitting specifically adapted to the type of packages to be dispensed, such as the bellows tip 227 (serving as an active suction cup) or a compliant tip without a weight. Hose 220 has one end coupled to a source of negative air pressure, i.e., suction, which source of suction comprises in the preferred embodiment a blower motor 226, and a free end coupled to the article pickup head 224. In the present invention, the word continuous is intended to mean a hose which is connected and acts between it's end points, in order to accomplish the functions required by it, as a unitary/single hose, i.e., one than one hose can be coupled together to act as a single hose. An air hose portion 235 provides suction from blower motor 226 to one port of an air junction box 229, while continuous hose 220 is connected to a second port of air junction box 229.

In accordance with the principles of the invention, a novel linkage arrangement is used, for example, for linking to, and thereby activating, a vacuum breaker assembly included in the air junction box 229. In the illustrated embodiment air junction box 229 is included at a top portion of hose storage area 222, and includes an airflow sensor and vacuum breaker assembly which is activated using the linkage of the present invention, as described in greater detail later. The airflow sensor is used to develop a signal representative of the airflow through air hose 220, which signal is applied to the controller of the vending machine. The vacuum breaker assembly is used to quickly bring the air pressure in hose 220 to the ambient pressure, thereby facilitating a "quick-release" of an article transported by the article pickup head, into the dispensing chute 210.

It is noted that a quick release of the products does not have to occur at the top of dispensing chute 210, and in the event that it is desirable to avoid subjecting the article to forces which result from jarring or dropping, the article pickup head could proceed to the bottom of the dispensing chute 210 before providing release of the article, with or without the use of the quick release valve.

As will be described in greater detail with reference to FIGS. 4 and 5, in one embodiment, the airflow sensor arrangement may comprises a two-part switch, a first part includes a reed switch mounted on a top portion of box 229, and a second part includes a magnet mounted at the free end of a swinging arm, i.e., an arm mounted so as to swing inside box 229 in response to changes in airflow in the box. As the arm swings inside box 229, the switch is "toggled", thereby indicating changes in airflow. The use of this airflow signal will also be described in greater detail later. In an further embodiment, the functions of the airflow valve and quick release could be built into the blower motor enclosure. With this arrangement, hose 220 would be continuous from the picker head all of the way to the blower motor.

In the present invention, the article handling apparatus is used to initiate movement of the novel linkage apparatus by contact at one portion thereof, which movement causes a corresponding movement at another portion of the linkage apparatus which is used to active the vacuum breaker assembly. Accordingly, further details of the article handling apparatus will now be described.

As shown generally in FIG. 3, alignment of carriage 218 with a selected one of bins 216 is accomplished in the front/back (Y) direction using a front/back linear slide 228 (shown in a cut-away view) mounted to an "L" shaped front/back beam 230 so that carriage 218 can be controllably positioned therealong using slide 228. A bottom edge portion of beam 230 includes a rack portion 232 and carriage 218 includes a reversible electric motor 233 that drives a gear (not shown) which engages rack portion 232. Application of forward and reverse motor control signals from control board 212 to motor 233 causes carriage 218 to be driven in the front/back directions. Alignment of carriage 218 in the left/right (X) direction is accomplished in a similar manner, using a left/right linear slide 234 which slidably couples the top side of front/back beam 230 to the underside of each of spaced apart left/right beams 236a and 236b. Beams 236a and 236b are rigidly attached to the inside top portion of cabinet 12. A rack 238, also rigidly attached to the top inside portion of cabinet 12 and in parallel with beams 236, is engaged by a gear 240 driven by a reversible motor 243 mounted near the inside corner of beam 230. Application of forward and reverse motor control signals from control board 212 to motor 243 causes a rotation of gear 240 and a corresponding movement of beam 230, and hence carriage 218, in the left/right (X) directions.

Carriage 218 includes a roller arrangement (not specifically shown, but which may comprise three orthogonally positioned rollers at the point where hose 220 enters carriage 218) for redirecting the movement of hose 220 from a substantially horizontal direction along the top interior portion of machine 10 (i.e., in the X,Y direction), to a direction perpendicular thereto (i.e., in the Z direction). Thus, movement of carriage 218 will move the free end 221 of hose 220 so that it can be axially aligned with a selected one of bins 216. Thereafter, a hose drive mechanism (not specifically shown, but which may comprise a set of conventionally operated "pinch rollers"), is driven by a reversible motor 508 for driving pickup head 224 into/out of the selected bin 216 in order to retrieve articles stored therein. In the illustrated embodiment the hose drive mechanism is mounted in carriage 218, but in a further embodiment the reversible motor 508 and the pinch rollers, or some other drive mechanism, such as an articulated arm, could be mounted so as to act somewhere else along the length of hose 220.

As shown in FIG. 3, as an article 223 is moved by pickup head 224 along its way from a storage bin 216 to chute 210, it is positioned past an article identification (ID) device 254 mounted within cabinet 12. A specific type of article ID device is not required for the present invention, and depending upon system constraints, such a device may comprise, for example, a bar code scanner or other optical image/pattern recognition system, or even a non-optical system, such as a radio frequency identification (RFID), or magnetic-based system mounted within cabinet 12. for uniquely identifying and confirming that the article being dispensed is in fact the article that was selected. The construction and operation of such article identification devices are well known to those of ordinary skill in this technology, and therefore further description in this regard is not necessary.

Alternative embodiments for the robotic mechanism described above can be used in conjunction with the present invention. For example, the linkage for operating the vacuum breaker (to be described in detail later in the illustrated embodiments), could also be useful in dispensing apparatus using other types of robotic positioners, such as a rotary type device (R, θ), an articulated arm, telescoping or scissor system, etc.

Even furthermore, although only a single storage area 215, hose 220 and carriage 218 are shown in the illustrated embodiment, the invention described herein could also be used in a dispensing apparatus/article handler of the type having multiple storage areas and/or robotic article handling mechanisms, such as two robotic mechanisms (vertically or horizontally positioned) each one serving, for example, a different storage area (such as one being refrigerated and one being non-refrigerated, or one being oriented for vertical storage of products and the other one for horizontal). In this case a separate hose, air flow sensor/vacuum breaker, linkage apparatus, hose positioning mechanism and hose storage area may be required, although they may possibly share a single source of suction (e.g., blower motor 226), airflow sensor and vacuum breaker. In a further embodiment, a single hose, hose positioning mechanism, air flow sensor/vacuum breaker and hose storage area could be used in a further embodiment where the single hose services more than one article storage area. Each robotic article handling mechanism could have its own article ID device, or they could share a single article ID device.

In the embodiment illustrated herein, blower motor 226 provides a relatively high volume of airflow but a relatively modest negative air pressure. As a matter of design choice, blower motor 226 could comprise a vacuum pump, so as to provide a much more substantial degree of negative air pressure, but, due to size and cost limitations, a correspondingly reduced amount of airflow. In this latter case, the diameter of the air hose 220 would be reduced from the diameter illustrated in FIGS. 2 and 3, which may be particularly important in some applications of the present invention. The illustrated embodiment is particularly useful for picking up flexible packages since a momentary or even sustained leak in the coupling to the packaging of the article will generally not result in dropping of the package, while at the same time offering extreme versatility due to the ability to pick up a wide variety of shaped objects of varying weight and size. In the event that blower motor 226 comprises a vacuum pump, it could be used alone or in combination with a storage tank coupled to the suction hose via a valve and air hose, in order to provide a greater volume of airflow. In a further embodiment a compressor could be used in combination with a venturi device to create a vacuum.

Figure 5:
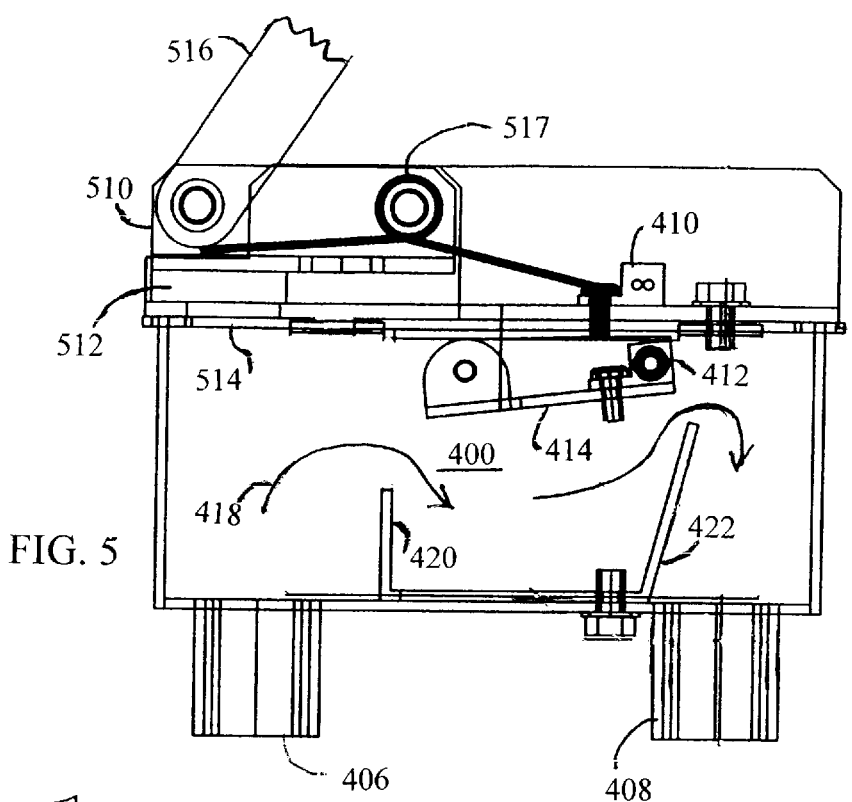
FIGS. 4 and 5 illustrate details of a vacuum junction box used in conjunction with a cabinet mounted operating linkage mechanism which is constructed and operates in accordance with principles of the present invention.
Figure 4:
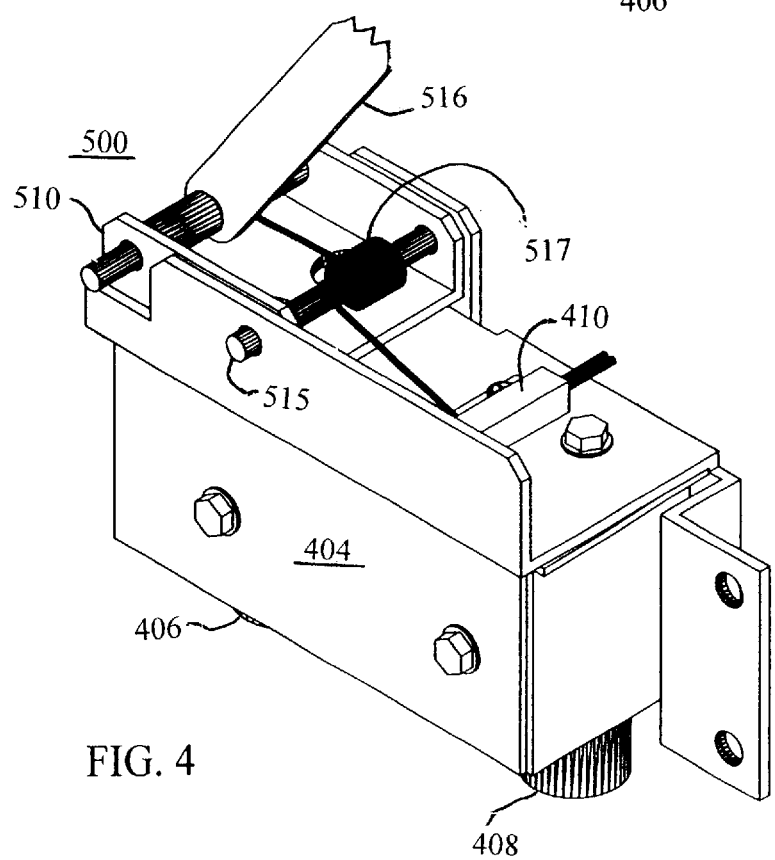
Figure 6:
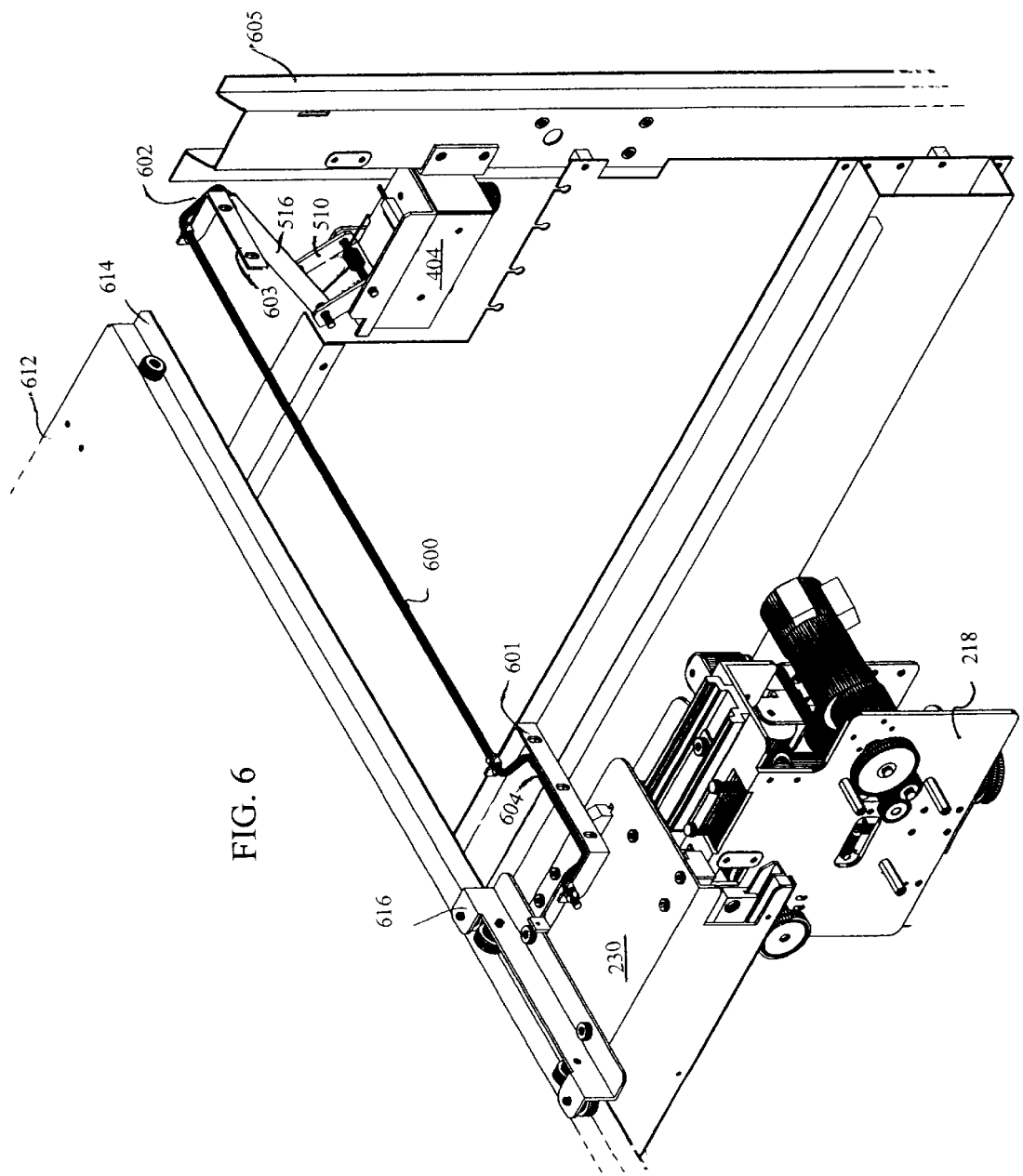
FIGS. 6, 7 and 8 illustrate details of a cabinet mounted operating linkage mechanism for operating the vacuum junction box of FIGS. 4 and 5, which is constructed and operates in accordance with the principles of the present invention.
Figure 7:
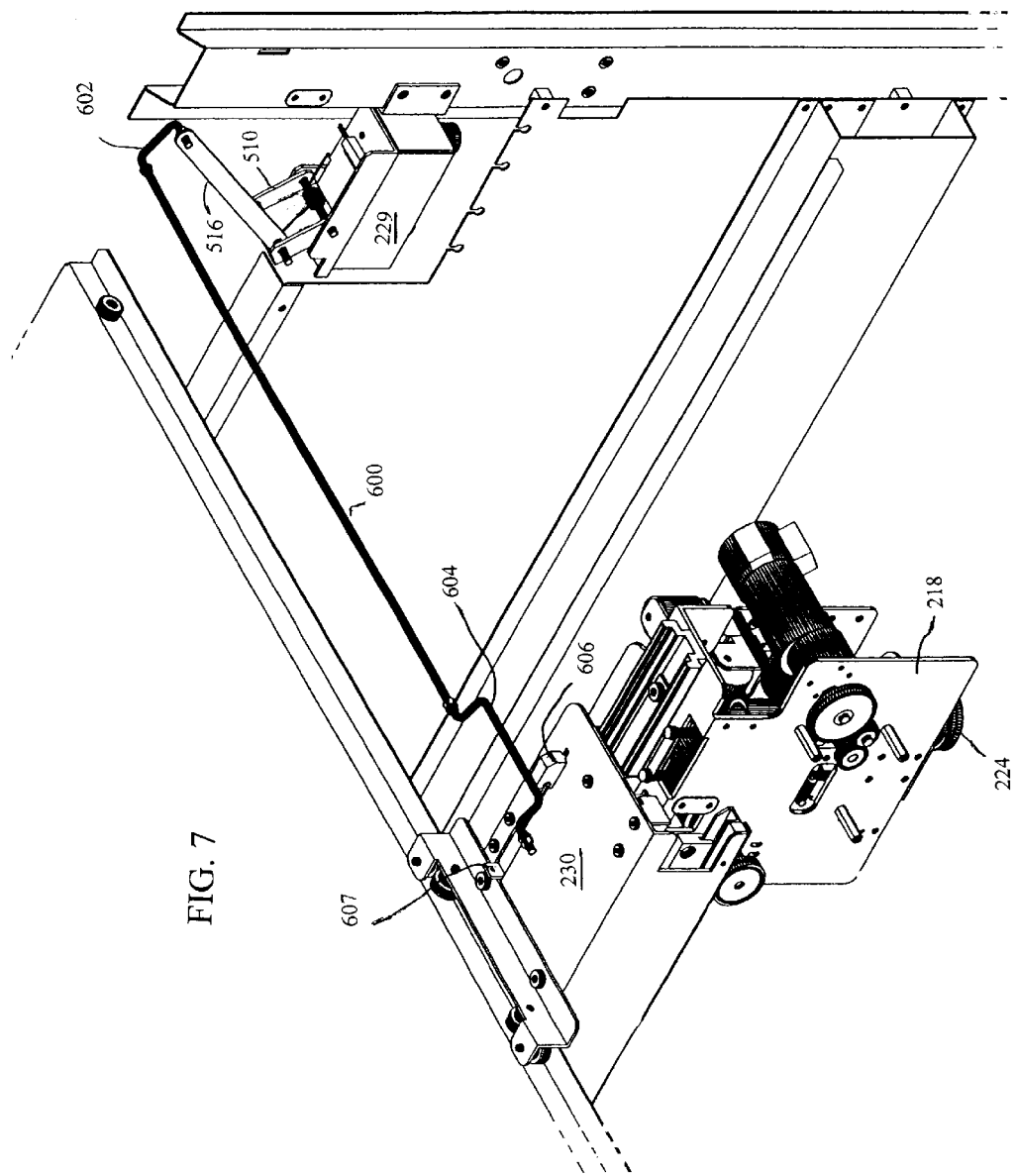
Figure 8:
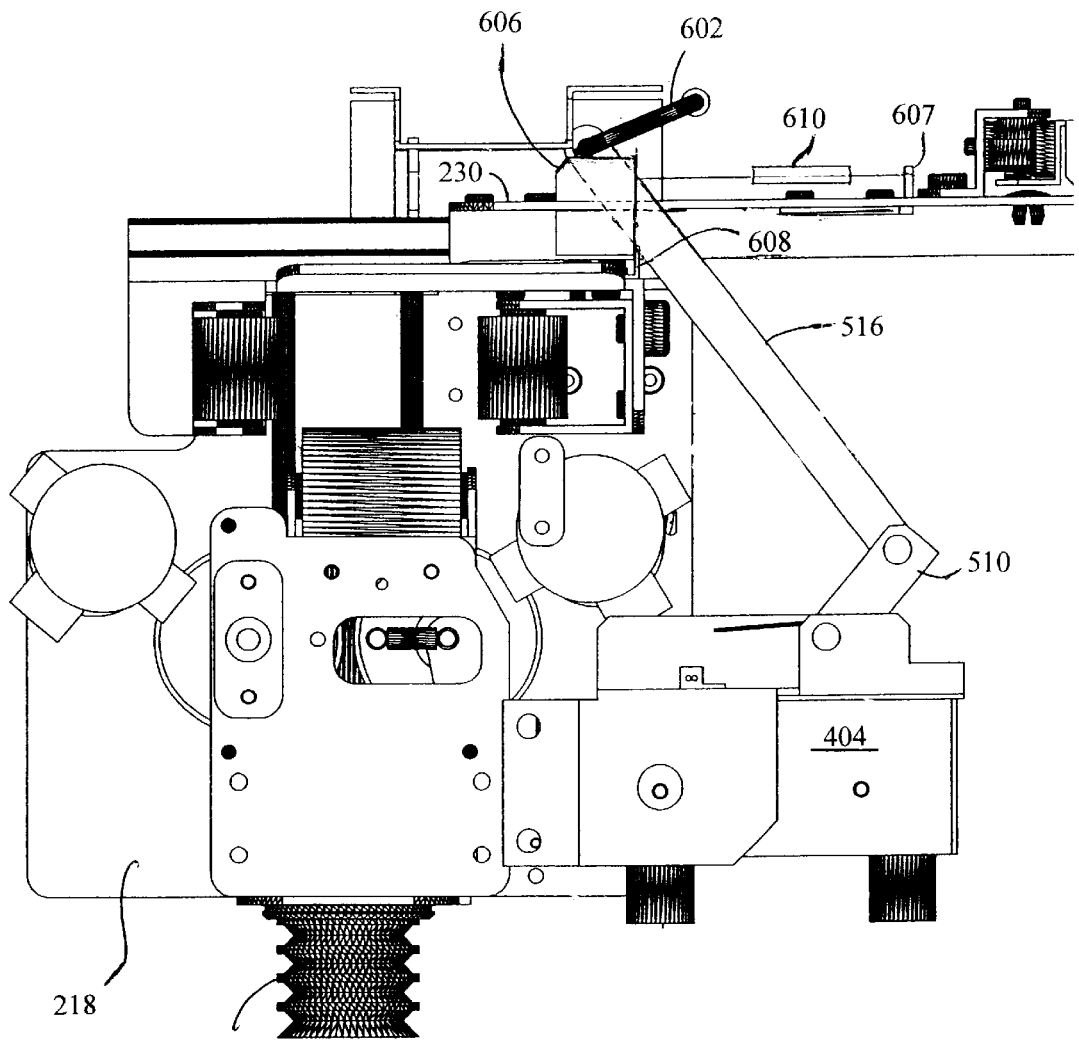
Figure 9:
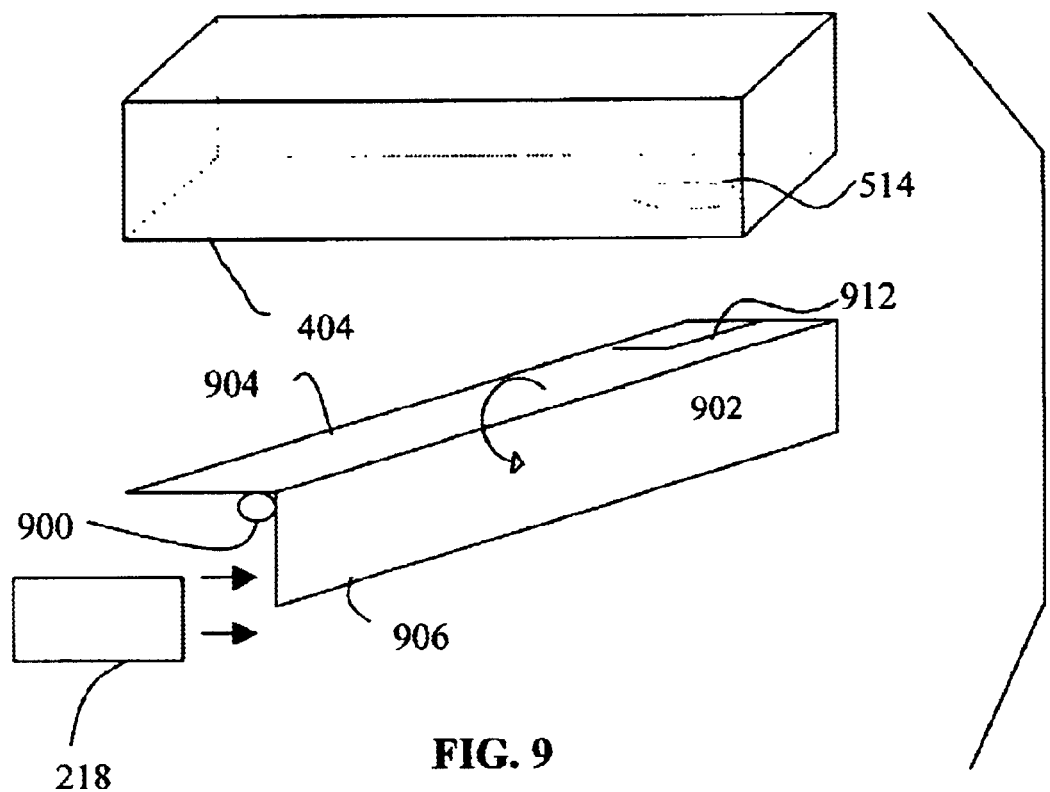
FIGS. 9 and 10 illustrate further embodiments for a linkage mechanism which is constructed and operates in accordance with the principles of the present invention.
Figure 10:
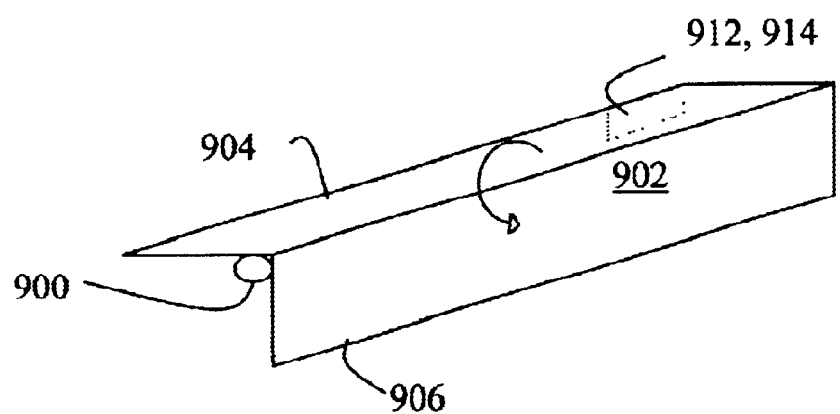

FIGS. 4 and 5 illustrate details of the air junction box 229 which is activated by the novel linkage apparatus constructed and operated in accordance with the principles of the present invention, FIGS. 6–8 illustrate one embodiment of the novel linkage apparatus and FIGS. 9 and 10 illustrate various further embodiments for the linkage apparatus. Note, linkage constructed and operated in accordance with the principles of the present invention can be used for activation of something other than the quick release described in the present embodiment, i.e., for any activation purpose. For example only, details of box 229 are now provided.

As shown in FIGS. 4 and 5, box 229 includes a housing 404 having an air inlet port 406 coupled to hose 220 and an air outlet port 408 coupled via a hose 235 to the blower motor 226. As previously described, blower motor 226 creates a negative air pressure (i.e., suction) which passes through housing 404 via ports 406 and 408 for creating suction at pickup head 224, for allowing picker head 224 to become releaseably engaged to a package requiring handling. In accordance with one aspect of the present invention, an air junction box 229 includes internal thereto an airflow sensor arrangement 400 (shown in detail in FIG. 5), and externally, a vacuum breaker mechanism 500. Vacuum breaker mechanism 500 includes a pivoting flap mechanism 510 mounted on a topside of housing 404. In FIGS. 4, 6, 7 and 8, flap 510 is shown in an open position. An underside of flap 510 includes a foam seal 512 attached thereto, which is aligned so as to cover a hole 514 in housing 404. Flap 510 includes upward facing side portions through which a pivot pin 515 is provided and around which flap 510 pivots upward when one end of a linkage arm 516 is raised. A spring 517 mounted on pivot pin 515 provides a "bias" which urges flap 510 to normally be in the "closed" or sealing state. When flap 510 is lifted upward, hole 514 is exposed to the ambient pressure environment, thereby resulting in a rapid release of the vacuum i.e., "suction force", in air hose 220.

In the illustrated embodiment, linkage arm 516 is shown to be lifted by a "crank" portion 602 of an elongate rotating member 600 which is constructed and operates in accordance with the invention. Member 600, in accordance with one aspect of the present invention, is mounted along the upper inside edge of cabinet 12, and is caused to rotate in response to carriage 218 reaching its article dispensing position, as will be described in greater detail with respect to FIGS. 6–8. By mounting member 600 for rotation at the upper inside edge of cabinet 12, it takes up a minimum amount of space, and does not interfere with product dispensing or loading. Additional benefits will be apparent from the following description.

As illustrated more clearly in FIG. 5, housing 404 includes therein an airflow sensor arrangement 400 for generating a signal which changes in response to the degree of airflow within air hose 220. In the illustrated embodiment, airflow sensor arrangement 400 comprises a two-part switch, a first part of the switch includes a reed switch 410 mounted on a top portion of housing 404, and a second part of the switch includes a magnet 412 mounted at the free end of a swinging arm 414, which "toggles" the operation of switch 410 upon close proximity thereto. Arm 414 swings about a pivot 416 in response to airflow (see arrows 418)

from port 406 towards port 408 through housing 404. During strong airflow, arm 414 is maintained in a substantially horizontal position, thereby putting magnet 412 in close proximity to switch 410 and causing reed switch 410 to be in a closed position. Preferably, air deflector panels 420 and 422 are provided in housing 404 in order to ensure that swinging arm 414 is raised to a height sufficient for proper operation of reed switch 410 during varying levels of airflow which may be experienced before article pickup head 224 makes a sufficiently good contact with a package to be dispensed.

Before pickup head 224 contacts a package, the strong airflow through housing 404 will cause arm 414 to swing substantially horizontal, thereby closing reed switch 410. Upon pickup head 224 contacting a package, the surface of the package will block the entrance of air into pickup head 224. This will cause a sudden decrease in airflow within housing 404. This decrease in airflow will cause arm 414 to swing downward and cause reed switch 410 to open, thereby sending a signal to control board 212. Accordingly, the airflow signal generated by reed switch 410 can be used for varying purposes.

Firstly, it can be used to indicate that pickup head 224 has made a secure contact to the package, and that it is now time to reverse the direction of the hose (Z) drive motor (to raise the package out of the storage area), and then activation of the X and Y drive motors (to transport the package from the storage area to the dispensing area.)

Secondly, the airflow signal can also be used by the vending machine control system as a check for carriage 218 reaching a precisely known position (e.g., the "dispensing" position, or a "virtual home" position). For example, once carriage 218 reaches the proper positioning for dispensing the package, it activates linkage 600 of FIG. 6, which is coupled to and operates the quick release air valve. Note, the quick release of vacuum in housing 404 causes reed switch 410 to again provide a change in the airflow signal (since the package is no longer blocking airflow into hose 220), which signal can be used to indicate to the control system that the package has been dispensed. Accordingly, it also indicates that the carriage has reached the dispensing position. The signal can then be used to turn off blower motor 226 and initiate return of carriage 218 to its rearward "home" position. In a further embodiment a standard positioning switch could be used to sense position of carriage 218, and the reed switch signal can be used as a backup signal in case the position sensor switch becomes non-operative.

Thirdly, since control board 212 monitors the airflow signal from reed switch 410, as well as maintaining an accurate count of the drive pulses for controlling the movement of carriage 218, the control board 212 can compare the timing of the airflow signal with the determined position of carriage 218 by the pulse counting technique (or in a further embodiment by using a standard position sensor) in order to intelligently decide if the selected package has been properly dispensed, or just inappropriately dropped. More specifically, the microprocessor portion of control board 212 compares the position of pick-up head 224 as determined by the x, y and z motor encoder pulses it has sensed (or in the further embodiment by using standard position sensors) with the desired position of pick-up head 224 at the time that the reed switch signal is sensed, which reed switch signal indicates that the package has just been released from the end of pick-up head 224. If the determined position of carriage 218 indicates that the pick-up head 224 was positioned at the time of receiving the airflow signal so that the package would be positioned into the customer retrieval area, then control board 212 can confirm that the vend has been successful. If, however, the timing of the airflow signal is such that it indicates that the position of pick-up head 224 is not close enough to the required article "drop point", then the vend is considered unsuccessful and will be re-executed. The range and tolerance of differential between the estimated and actual article drop positions, as determined by the comparison done by the controller between the timing of the airflow signal with the position determined by the motor encoder signals, can be determined by a setting in the control system.

Note, reed switch 410 can be of the normally open or normally closed type and that in other embodiments, the deflector panels may or may not be required. Furthermore, although in the illustrated embodiment a magnetic reed switch is used as the switching element for airflow sensor 400, other types of sensors could be utilized to indicate movement of swinging arm 414, such as a capacitive or inductive sensor/switch arrangement. Additionally, other types of mechanical arrangements can be devised for causing a portion of the airflow sensor to move within housing 404, such as an non-pivoting arm 414 that is made of a material flexible enough to move in response to changes in airflow, just as if it were connected to housing 404 via a pivot.

As shown in FIG. 6, brackets 601 and 603 are mounted to a horizontal structural support rib portion located along the top front of cabinet 12 (in the interest of clarity the horizontal structural support is not shown, but it is similar to the vertical rib portion 605, shown in FIG. 6 mounted along the right front side of cabinet 12), and includes openings therein which support rotating linkage member 600 along the top inside portion of cabinet 12 of vending machine 10. Member 600 includes at one end a first operating portion comprising a "crank" 602, which, when member 600 is rotated, raises and lowers linkage 516, which in turn opens and closes the seal that flap 510 makes with hole 514. Positioned at the other end of member 600 is a second operating portion 604 which in the illustrated embodiment also comprises a crank. As shown more clearly in the perspective view of FIG. 7 and side view of FIG. 8, in which brackets 601 and 603 are removed, portion 604 is operated by direct contact with a sliding tab 606 mounted to as to extend both above and below a horizontal top portion of front/back beam 230. As shown more clearly in FIG. 8, a lower portion of sliding tab 606 is contacted by a tab 608 mounted to the rear of carriage 218. A spring 610, connected between sliding tab 606 and a stationary tab 607, normally biases sliding tab 606 toward the rear of cabinet 12. Accordingly, as carriage 218 reaches the correct frontal position for dispensing a product it has transported from the storage area to the dispensing area, carriage mounted tab 608 pushes sliding tab 606 forward and into contact with crank portion 604 of rotating member 600. In response, crank portion 602 rotates, member 600 and the other crank portion 602 also rotate, and as previously described, causes flap 510 to be lifted and release the suction in picker head 224, thereby causing the desired quick release of the transported article. (Note, in FIGS. 6 and 7, the means for positioning carriage 218 shown in FIG. 3, namely the left/right slides 234 and beams 236a and 236b, are replaced by somewhat equivalent structure comprising the outer edges 614 of a support plate 612, which are engaged by opposed roller brackets 616).

The illustrated embodiment for construction and operation of the linkage including member 600 is only an example of a particular embodiment, and substantial modifications and alternatives can be conceived therefore. For example, in a further embodiment link 516 can be omitted and the end of crank portion 602 can directly lift seal/flap 512/510. In an even further embodiment, crank portion 602 can be used to activate an electromechanical device, such as a solenoid, which then operates flap 510.

In this regard, instead of having a crank portion 602, that end of member 600 can instead be straight and have a "screw-driver" type end. The tip of the "screw-driver" type end can engage and directly operate, flap 510, or, for example in an even further embodiment, a ball-type (or butterfly or similar) valve in housing 404 could be used for unsealing an opening in housing 404 and letting in outside air, thereby providing the same function as was provided by lifting of seal/flap 512/510.

In a still further embodiment, seal/flap 512/510 can be incorporated into the end of rotating member 600 instead of crank portion 602. FIG. 9 illustrates one such further embodiment. Rotating member 902 includes an "L" shaped cross-section, which rotates about an axis 900. An upper section 904 includes at one end thereof a seal 912 like seal 512, which is aligned with a downward facing side of housing 404. Housing 404 is modified to include its hole 514 in its downward facing side instead of an upward facing side. Member 902 is biased by a spring, not shown, so that seal 912 normally seals hole 514 in a manner similar to that described above for FIGS. 4 and 5. A lower section 906 of member 902 is positioned so as to be contacted, directly or indirectly, by the leading edge of carriage 218 when it reaches the desired dispensing position. Upon such contact, member 902 rotates, seal 912 unseals hole 514, and the article is quickly released. Note, one benefit of this embodiment is that portion 906 can extend any desired amount along the length of member 902 and therefore a single member 902 could be used in schemes having, for example multiple robotic positioners (carriages 218) or a positioner which brings articles to multiple dispensing areas. In a further embodiment, seal 912 could be included, for example on a tab portion of upper section 904, as shown by FIG. 10, where a tab portion 914 extends downwardly from upper section 904, and housing 404 is modified so that hole 514 is positioned at an end sidewall thereof which faces tab portion 914.

Even furthermore, as noted above, it may be desirable that the quick release of the product is not required until the pickup head has moved the product to the bottom of the product delivery chute 210. In this embodiment, the way for activating the forenoted linkage shown in FIGS. 6–8 would need modification. For example, the quick release valve could the activated in response to an additional movement by carriage 218. That is, instead of linkage 600 being activated by forward motion of carriage 218, a modification of linkage 600 could be provided which would require for rotation, a horizontal (left/right) movement of the carriage after it has reached the front-most position in the cabinet. Such horizontal movement by the carriage could take place immediately after the pickup head has reached the bottom of chute 210.

Many of the benefits of the invention described herein could also be particularly useful in an article dispensing apparatus of the type having a refrigerated compartment, such as a chest freezer including various doors thereon (such as described for the ice cream dispenser in U.S. Pat. No. 5,240,139), in combination with the forenoted methods and apparatus for creating, sensing and/or maintaining suction at the gripping end of the suction hose.

While this invention has been particularly shown and described with references to preferred embodiments thereof, it will be understood by those skilled in the art that various changes in form and details may be made therein without departing from the spirit and scope of the invention. In fact, many such changes are already noted in this description. Those skilled in the art will recognize, or be able to ascertain using no more than routine experimentation, many equivalents to the specific embodiments of the invention described specifically herein. For example, although rotating member 600 is shown mounted at the top front portion of cabinet 12, other locations may be useful in other situations, for example member 600 could be mounted along vertically oriented rib 605 of FIG. 6 with appropriate changes needed to the position of housing 404 and inclusion of a means for causing carriage 218 to operate member 600. Even furthermore, linkage 600 may not even rotate, but instead have a translational movement which is transmitted via other linkage (s) to active/operate the quick release device. Such equivalents are intended to be encompassed within this description of the invention.

What is claimed is:

1. An article dispensing apparatus, comprising:
   an article storage area;
   an article grasping mechanism;
   a positioning mechanism coupled to the article grasping mechanism for controllably positioning the article grasping mechanism so as to be aligned with a given article stored in the storage area, for controllably contacting and extracting said article from the storage area, and for controllably positioning the article grasping mechanism so as to transport said article to a dispensing area;
   a control mechanism for controlling operation of said article grasping mechanism and said positioning mechanism;
   a quick release device coupled to the article grasping mechanism and responsive to an input for facilitating a quick release from said article grasping mechanism of the article being handled; and
   a rotating linkage mechanism having one end adapted to contact said positioning mechanism when said hose positioning mechanism is positioned for delivering said article to said dispensing area, and said linkage mechanism having an other end adapted to provide said input for operating said quick release device.

2. The article dispensing apparatus of claim 1, wherein said linkage mechanism comprises a rod, and said one and other ends of the linkage mechanism each comprise a crank portion of said rod.

3. The article dispensing apparatus of claim 1, wherein the article grasping mechanism includes a hollow tubular member which selectively carries a vacuum pressure for grasping to the article.

4. The article dispensing apparatus of claim 3, wherein said quick release device comprises a relatively airtight housing, said housing having a pneumatic coupling between first and second input ports, said first input port being pneumatically coupled to said tubular member, and said second input port being pneumatically coupled to a source of said vacuum pressure.

5. The article dispensing apparatus of claim 4, wherein said housing also includes an airflow control mechanism which is selectively operable by said linkage mechanism for allowing a rapid influx of air into said housing, thereby facilitating a quick release by said article grasping mechanism of the article being dispensed.

6. The article dispensing apparatus of claim 5, wherein said airflow control mechanism comprises:

an opening in said housing, and
a releasable air-sealing mechanism for substantially sealing said opening in said housing so air does not pass therethrough, and being selectively operable by said linkage mechanism for releasing said seal so as to allow air to pass therethrough.

7. The article dispensing apparatus of claim 6, wherein said rotating linkage mechanism has one end adapted to be contacted by said positioning mechanism when said positioning mechanism is positioned for delivering said article to said dispensing area, and an other end adapted to cause activation of said releasable air-sealing mechanism.

8. An article dispensing apparatus, comprising:
an article storage area;
an article grasping mechanism;
a positioning mechanism coupled to the article grasping mechanism for controllably positioning the article grasping mechanism for extracting said given article from the storage area and transporting said article to a dispensing area;
a control mechanism for controlling operation of said article grasping mechanism and said positioning mechanism; and
a quick release device for facilitating a quick release by said article grasping mechanism of the article being transported, upon receipt by the quick release device of an input; and
a linkage mechanism having one portion adapted to be contacted in response to said positioning mechanism reaching a position for delivering said article to said dispensing area, and said linkage mechanism having an other portion adapted to provide said input for operating said quick release device in response to such contact.

9. The article dispensing apparatus of claim 8, wherein said linkage mechanism comprises a rod, and said one and other portions of the linkage mechanism each comprise a crank portion of said rod.

10. The article dispensing apparatus of claim 8, wherein said linkage mechanism comprises an elongate L-shaped pivot, and said one and other ends of the linkage mechanism each comprise a different leg of the L-shaped pivot.

11. The article dispensing apparatus of claim 8, wherein the article grasping mechanism includes a hollow tubular member which selectively carries a vacuum pressure for grasping to the article.

12. The article dispensing apparatus of claim 11, wherein said quick release device comprises a relatively airtight housing, said housing having a pneumatic coupling between first and second input ports, said first input port being pneumatically coupled to said tubular member, and said second input port being pneumatically coupled to a source of said vacuum pressure.

13. The article dispensing apparatus of claim 12, wherein said housing also includes an airflow control mechanism selectively operable by said linkage mechanism for selectively allowing a rapid influx of ambient air pressure into said housing, thereby facilitating a quick release by said article grasping mechanism of the article being dispensed.

14. The article dispensing apparatus of claim 13, wherein said airflow control mechanism comprises:
an opening in said housing, and
a releasable air-sealing mechanism for substantially sealing said opening in said housing so air does not pass therethrough, and being selectively operable by said linkage mechanism for releasing said seal so as to allow air to pass therethrough.

15. The article dispensing apparatus of claim 14, wherein said linkage mechanism has one end coupled so as to be operated by said positioning mechanism when said positioning mechanism is positioned for delivering said article to said dispensing area, and an other end adapted to cause activation of said releasable air-sealing mechanism.

16. A method of dispensing an article, comprising:
providing an article storage area;
providing an article grasping mechanism;
controllably positioning the article grasping mechanism for causing an extraction of said given article from the storage area and a transporting of said article to a dispensing area; and
operating a quick release device for facilitating a quick release by said article grasping mechanism of the article being transported, upon receipt by the quick release device of an input; wherein
said operating of the quick release is provided by a linkage mechanism having one portion adapted to be contacted in response to said positioning mechanism reaching a position for delivering said article to said dispensing area, and said linkage mechanism having an other portion adapted to provide said input for operating said quick release device in response to such contact.

17. The method of claim 16, wherein said positioning mechanism directly contacts said linkage mechanism for operating said quick release device.

18. The method of claim 16, wherein said positioning mechanism indirectly contacts said linkage mechanism for operating said quick release device.

19. The method of claim 16, wherein said linkage mechanism rotates in repsonse to contact by said positioning mechanism, to provide said input.

* * * * *